United States Patent [19]

Chennakeshu et al.

[11] Patent Number: 5,371,471
[45] Date of Patent: Dec. 6, 1994

[54] LOW COMPLEXITY ADAPTIVE EQUALIZER RADIO RECEIVER EMPLOYING DIRECT REFERENCE STATE UPDATES

[75] Inventors: Sandeep Chennakeshu, Schenectady; Ravinder D. Koilpillai; Raymond L. Toy, both of Latham, all of N.Y.

[73] Assignee: General Electric Company, Schenectady, N.Y.

[21] Appl. No.: 143,011

[22] Filed: Oct. 29, 1993

[51] Int. Cl.[5] .......................................... H04L 27/12
[52] U.S. Cl. ...................................... 329/304; 375/14; 375/80; 375/84; 375/101
[58] Field of Search ................... 329/304, 306, 310; 375/14, 80, 84, 94, 101

[56] References Cited

U.S. PATENT DOCUMENTS

| | | | |
|---|---|---|---|
| 4,603,393 | 7/1986 | Laurent et al. | 329/306 X |
| 4,656,648 | 4/1987 | Vallet | 375/80 |
| 5,263,026 | 11/1993 | Parr et al. | 375/94 X |
| 5,285,480 | 2/1994 | Chennakeshu et al. | 375/101 |

OTHER PUBLICATIONS

"Receiver Performance for the North American Digital Cellular System" by G. Larsson, B. Gudmundson, K. Raith, 41st Vehicular Technology Society Conference Proceedings, pp. 1–6, St. Louis, Mo. May 1991.

Forney, Jr., "The Viterbi Algorithm", Proceedings of the IEEE, vol. 61, pp. 268–278, Mar. 1973.

"An Adaptive MLSE Receiver for TDMA Digital Mobile Radio" by R. D'Avella, et al, IEEE Jorunal on Selected Areas in Communications, vol. 7, No. 1, Jan. 1989, pp. 122–129.

Primary Examiner—Siegfried H. Grimm
Attorney, Agent, or Firm—Lawrence P. Zale; Marvin Snyder

[57] ABSTRACT

A low complexity adaptive equalizer for use in U.S. digital cellular radios demodulates $\pi/4$-shifted differentially encoded quadrature phase shift keyed (DQPSK) encoding in the presence of intersymbol interference (ISI) with reduced decoding complexity by employing an estimated received constellation which takes into account channel changes over time and ISI. The decoding complexity is reduced by tracking a reduced number of estimated reference symbol constellation points and taking advantage of the geometry to estimate the remaining symbol constellation points. Reference symbol constellation points are updated directly to compensate for changes in the channel, instead of determining channel impulse response (CIR) coefficients, and convolving the CIR coefficients with received symbols to determine new reference symbol constellation points.

3 Claims, 6 Drawing Sheets

CHANNEL MODEL

LOW COMPLEXITY ADAPTIVE EQUALIZER RADIO RECEIVER EMPLOYING DIRECT REFERENCE STATE UPDATES

CROSS REFERENCE TO RELATED APPLICATIONS

The present application is related to U.S. patent applications "A Low Complexity Adaptive Equalizer Radio Receiver Employing Reduced Complexity Branch Metric Calculation" by Sandeep Chennakeshu, Ravinder David Koilpillai, Raymond Leo Toy Ser. No. 08/143,027, and "A Low Complexity Adaptive Equalizer for U.S. Digital Cellular Radio Receivers" by Sandeep Chennakeshu, Paul W. Dent, Ravinder David Koilpillai, Raymond Leo Toy Ser. No. 08/143,028, both filed concurrently herewith.

BACKGROUND OF THE INVENTION

1. Field of the Invention

This invention relates to mobile radio systems and more specifically to transmitting, receiving and demodulating digital information in a digital radio system.

2. Description of Related Art

In digital mobile radio systems, base units communicate with mobile radio units. Both base and mobile units employ a transmitter and receiver. During communication, one of the communicating units transmits symbols embedded in a continuous radio-frequency (RF) signal allowing a receiver to decode the RF signal into digital information. The motion of the mobile units causes impairments in the signal, or channel impairments, known as Doppler shifts.

Transmitted signals may be received directly by the receiving unit as a first ray, and also as a second ray which is reflected from a physical object. This is a channel impairment known as multi-path propagation. The second ray may arrive at the receiving unit slightly later due to its longer transmission path. This is known as delay spread.

Another channel impairment is known as intersymbol interference (ISI). Data symbols are usually filtered before transmission. This filtering causes a symbol to have a duration that is longer than a symbol duration before filtering. ISI arises when a symbol overlaps onto a subsequent symbol period and thereby affects the next transmitted symbol. ISI arises due to multi-path propagation and due to the nature of a filtered transmitted symbol.

If the above channel impairments remain uncorrected, the received signal when demodulated could result in data with a high probability of error, causing a significant increase in bit error rate (BER) in the decoded digital information. In order to improve the BER, an equalizer is employed to demodulate the ISI-impaired received signal.

For the U.S. digital cellular system (IS-54), a time division multiple access (TDMA) system, the following mobile channel model has been specified in "Recommended Minimum Performance Standards for 800 MHz Dual-Mode Mobile Stations", (incorporating EIA/TIA 19B), EIA/TIA Project Number 2216, March 1991 for the purpose of evaluating the performance of candidate equalizer designs. The mobile channel is specified to be a two ray multipath model. Both rays are independently Rayleigh faded, with equal average power, and frequency shifted by a Doppler spread corresponding to the vehicle speed. The delay spread is defined in terms of a delay interval ($\tau$) which is the difference in microseconds between the first and last ray in the two ray channel model.

Any communications system for U.S. Digital cellular telephones must meet the specified requirements on the channel model described above. Further, it is desirable that the mobile transmitter/receiver be small, (preferably hand-held), have low power consumption and be of low complexity. The need for an equalizer in a cellular radio telephone increases the complexity and power drain. Hence there is a need to design the equalizer for the above-mentioned application such that it is of low power, low complexity and will meet the performance specifications of the U.S. digital cellular TDMA standard.

Non-linear equalization schemes such as decision feedback equalization and equalization using maximum likelihood sequence estimation (MLSE) are considered appropriate for the above mobile channel. Decision feedback equalizers (DFEs) present a powerful equalization scheme as described in "Decision Feedback Equalization for Digital Cellular Radio" by S. Chennakeshu, A. Narasimhan, J. B. Anderson, Proceedings of ICC,339.41-339.4.5, pp. 1492-1496,1990; and "An Adaptive Lattice Decision Feedback Equalizer for Digital Cellular Radio", Proceedings of VTC, pp. 662-667, 1990 by A. Narasimhan, S. Chennakeshu, J. B. Anderson and can be very effective when used in conjunction with antenna diversity. However, they are usually too complex to implement in a mobile receiver. The complexity is mainly due to the requirement for a fast recursive least squares (FRLS) algorithm to estimate and track the channel impulse response (CIR). Further, these approaches are prone to error propagation and consequently high BER at higher vehicle speeds.

A DFE approach with a novel block-adaptive strategy is described in "Adaptive Equalization and Diversity Combining for a Mobile Radio Channel" by N. W. K. Lo, D. D. Falconer, A. U. H. Sheikh, Proceedings of Globecom, 507A.2.1-507A.2.5, pp. 923-927, 1990 wherein the time varying CIR estimates are computed through interpolation between known CIR estimates. This scheme entails lower complexity than the above approaches and eliminates the effect of error propagation, since there is no decision directed estimation of the CIR. When used in conjunction with antenna combining this method has been shown to be very effective. However, in the U.S. digital cellular system the use of $\pi/4$-shifted DQPSK modulation causes the CIR estimates to have phase ambiguities, which precludes direct application of the block-adaptive CIR interpolation scheme.

Another problem with the DFEs is that they exhibit sensitivity to the non-minimum phase condition in the channel, which occurs when the second ray is stronger than the primary ray. These limitations of the DFE make the MLSE based algorithms preferable for use in mobile radio receivers.

An MLSE based receiver which may be used in U.S. digital cellular system is disclosed in U.S. Patent Application "Adaptive MLSE-VA based Receiver for Digital Cellular Radio" by S. Chennakeshu, A. Narasimhan, J. B. Anderson Ser. No. 07/753,578 filed Sep. 3, 1991, and now U.S. Pat. No. 5,285,480. This MLSE based receiver is also relatively complex to implement.

Analysis of the equalizer algorithm indicates that the complexity stems from i). the branch metric computations, ii).CIR estimation and tracking which requires an adaptive algorithm, iii). the need for a CIR extrapolation scheme, due to the use of a large "decision depth" (usually greater than 5 symbols), especially at high vehicle speeds (>60 Kmph). In view of the complexity of the computations, requiring more than 5 million manipulations per second (MIPS) to run at a required data rate of 48.6 kilobits per second (Kbps), this MLSE based design limits its use in smaller transceivers.

An alternate MLSE receiver implementation, entailing a computational complexity requiring 9-10 MIPS is disclosed in "Receiver Performance for the North American Digital Cellular System" by G. Larsson, B. Gudmundson, K. Raith, 41st Vehicular Technology Society Conference Proceedings, pp. 1-6, St. Louis, Mo., May 1991. Although this MLSE receiver satisfies the requirements of U.S. TDMA digital cellular telephone system, the complexity is considered to be too high for implementation in a mobile radio receiver. It is, however, a good candidate equalizer for the base station.

U.S. patent application "Adaptive Maximum Likelihood Demodulator" by Paul W. Dent Ser. No. 07/868,339 describes a method of demodulating digital information employing a maximum likelihood sequence estimator (MLSE) equalizer.

Currently there is a need for a simplified digital radio equalizer for demodulating information encoded in a transmitter in accordance with the U.S. digital cellular standard (IS-54) and more generally, a need for realizing a low complexity MLSE equalization technique for TDMA digital radio transmissions over channels producing ISI.

OBJECTS OF THE INVENTION

An object of the present invention is to provide a communication system employing a simplified equalizer in the receiver for time division multiple access (TDMA) cellular systems.

Another object of the invention is to provide a hand-held communication system for TDMA cellular telephone systems.

SUMMARY OF THE INVENTION

A digital communication system comprises a digital information source for providing data symbols to be transmitted, a transmitter for transmitting data symbols in a digital radio-frequency (RF) signal, an antenna for sensing the RF signal, a receiver employing an equalizer, and an output means for utilizing the decoded data symbols.

The receiver may be a mobile radio receiver or hand-held portable radio receiver employing the method for demodulating $\pi/4$-shifted DQPSK data, which satisfies the minimum bit error rate (BER) performance requirements of the TDMA based U.S. Digital Cellular system (IS-54).

The present invention is based on a maximum likelihood sequence estimation (MLSE) approach and improves on the prior art by: i). reducing the number of computations in the branch metric, ii). directly updating estimated received symbol constellation points by an improved technique, iii). employing information previously calculated from symbol computations for branch metrics, iv). employing an improved gradient algorithm for updating signal states, v). elimination of extrapolation of CIR estimates employed in prior art receivers, and vi) decoding partial segments in forward and reverse directions.

The present invention satisfies the bit error rate (BER) specifications of the Cellular Telecommunications Industries Assoc. (CTIA), has a low calculation complexity requirement of approximately 3 MIPs for the required data transmission rate. Further, the complexity of the method of the present invention can be reduced to approximately 1.5 MIPS for implementation in a hand-held portable radio.

The equalizer is designed to be enhanced by bi-directional decoding of data slots in partial forward and reverse directions in order to isolate a fade period and enhance performance.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

DETAILED DESCRIPTION OF THE INVENTION

Received Signal with ISI

As mentioned above, ISI is the superposition of a previously transmitted signal onto the present symbol. This can be represented in an equation for a received signal sample r[n] being a digital approximation of the analog received signal r(t):

$$r[n] = h_0[n]s[n] + h_1[n]s[n-1] \qquad (1)$$

where $h_0[n]$ and $h_1[n]$ are time-varying channel coefficients with complex gains each having a phase and an amplitude which describe transmission through a channel and $s[n]$ represents the actual transmitted data. In the U.S. digital cellular telephone standards referenced above, a two-ray model for intersymbol interference is employed, which is the same model employed here, denoted as:

$$r[n] = h_0[n]s[n] + h_1[n]s[n-1]. \qquad (2)$$

Transmission

Figure 1B:
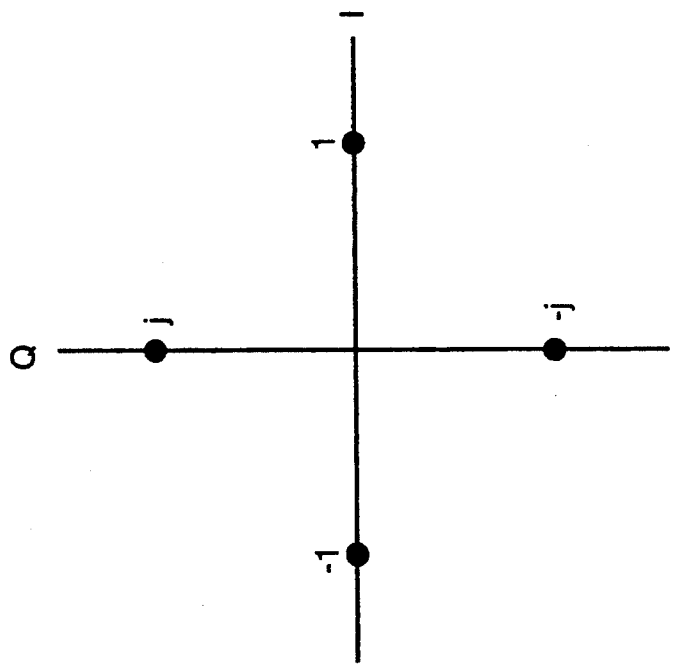
FIG. 1b is a graphic representation of an odd symbol constellation for $\pi/4$-shifted differentially encoded quadrature phase shift keying (DQPSK).
Figure 1A:
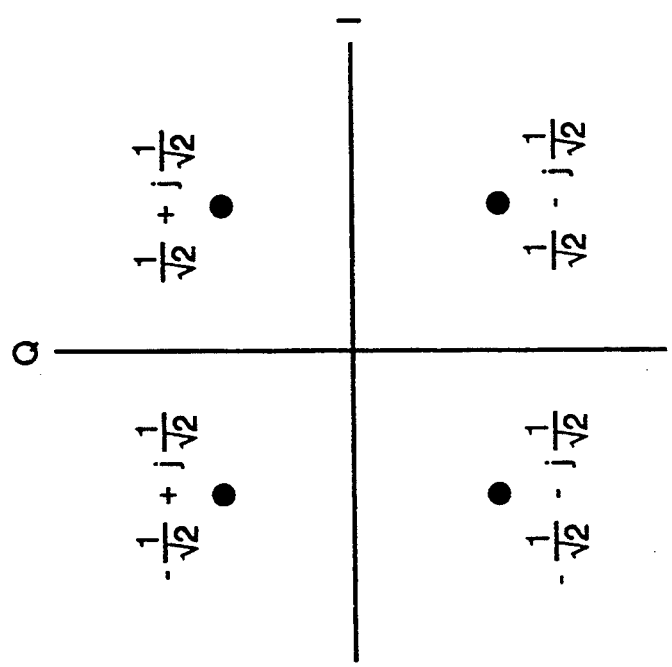
FIG. 1a is a graphic representation of an even symbol constellation for $\pi/4$-shifted differentially encoded quadrature phase shift keying (DQPSK).

In $\pi/4$-shifted differential quadrature-phase shift keying ($\pi/4$-shifted DQPSK), symbols are transmitted alternately as a phase angle from an even symbol constellation, as shown in FIG. 1a, then from odd symbol constellation, as shown in FIG. 1b. If the last symbol sent $s[n]$ was from the even symbol, then the previous symbol $s[n-1]$ was chosen from odd symbol constellation. The symbols of the even constellation may be denoted as $\{S\}$ and those of the odd constellation may be denoted as $\{\hat{S}\}$, with j, i representing the symbol index of a symbol chosen from the even and odd constellations denoted as $s_j[n]$ and $\hat{s}_i[n]$, respectively.

Symbol Decoding

In prior art methods of equalizing and decoding of signals, after the symbols are transmitted to a receiver, an exhaustive search for symbols $s[n]$ is executed which minimizes a path metric, being a sum of all branch metrics, each representing a Euclidian distance (squared) between received signal samples and an estimate of the received samples given by:

$$\text{path metric} = \min_{\{s[n]\}} \left[ \sum_n |r[n] - h_0[n]s[n] - h_1[n]s[n-1]|^2 \right] \qquad (3)$$

The estimated received signal samples are a convolution of the perturbation which occurs during transmission through the channel, defined by channel coefficients $h_0[n]$, $h_1[n]$, and the symbols $s[n]$, $s[n-1]$ which were originally transmitted. The intent is to obtain the original transmitted symbols $s[n]$ from the received symbols $r[n]$. A maximum likelihood sequence estimation (MLSE) scheme, such as a Viterbi algorithm, may be implemented in decoding $\pi/4$-Shifted-DQPSK encoded digital information as described in "Viterbi Algorithm", Proceedings of the IEEE, Vol. 61, pp. 268-278, March 1973; and MLSE type decoders as described in "An Adaptive MLSE Receiver for TDMA Digital Mobile Radio", by R. D'Avella, et al, IEEE Journal on Selected Areas in Communications, Vol. 7, No. 1, January 1989, pp. 122-129. This scheme performs the search to find best symbols sequence $\{s[n]\}$ that minimizes the above path metric.

Figure 2A:
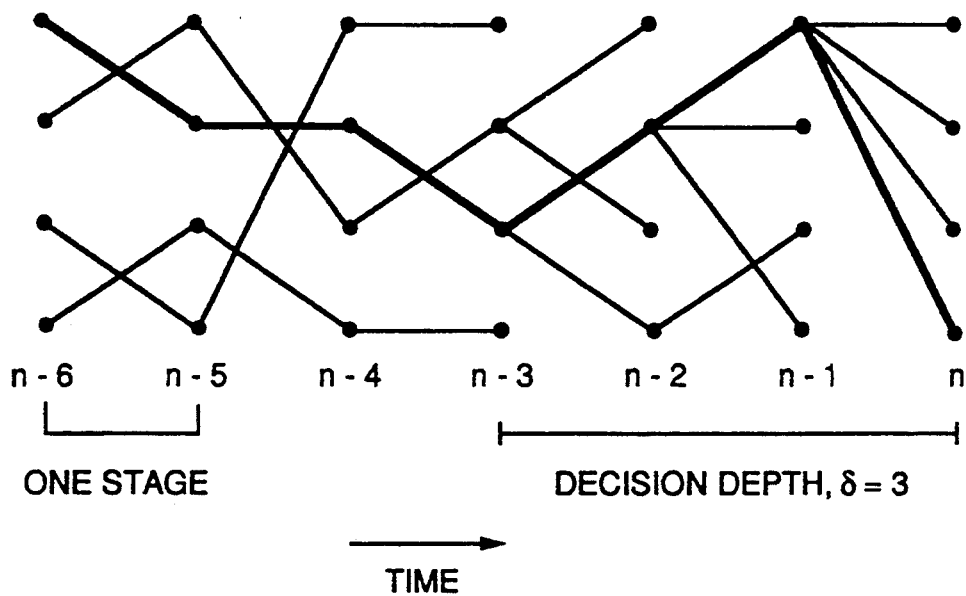
FIG. 2a is an estimated encoder state change diagram over time having four states, commonly referred to as a trellis state diagram.

To understand the method of demodulating received symbols similar to that executed by the Viterbi algorithm, an encoder state change diagram over time is required. In the problem considered herein, the encoder refers to ISI produced by the channel since the channel transforms a single transmitted symbol into a received symbol with ISI. For purposes of illustration, the transmitter and channel may be represented as a single encoder that produces the received signal described by Eq. (1). This type of encoder state diagram is commonly referred to as a trellis diagram. FIG. 2a illustrates a simple trellis for an ISI problem generated by a two ray channel. The following are assumed: there are two channel impulse response (CIR) coefficients $h_0[n]$, $h_1[n]$, and each transmitted symbol can take 4 values. The trellis shown in FIG. 2a illustrates the possible states of an encoder (transmitter and channel) and the progression of a sequence of states over time, shown by paths through the trellis. Each possible state transition has been pre-assigned to a transmitted symbol in the construction of the encoder. As the encoder receives information, it changes encoder states and transmits symbols corresponding to these assigned state changes. Each state at a specified time (or "stage") is defined as a node. At each time instant, there are 4 nodes in the trellis; therefore, this system is known as a "4 state trellis". There are branches that connect nodes from one time instant to the next. A branch is specified by a symbol pair denoted by $\{s[n],s[n-1]\}$. A continuous set of these branches, referred to as a path through the trellis, signifies a possible combination of symbols that can be transmitted.

A temporary assumption is made that the values of $h_0[n]$, $h_1[n]$ are known for all time instants n. A metric or "weight" can be assigned to each branch or transition employing $h_0[n]$,$h_1[n]$ and the symbol pair $\{s[n],s[n-1]\}$ associated with each branch. This "branch metric" corresponding to $n^{th}$ time instant is defined as:

$$d_{ji}(n) = |r_n - \{h_0[n]s_i[n] + h_1[n]s_j[n-1]\}|^2 \qquad (4)$$

The above definition represents the "branch metric" corresponding to the branch from node "j" at time $n-1$, to node "i" at time n. This branch metric signifies a measure of distance between the actual received signal sample to the estimation of the received signal sample $\{h_0[n]s_i[n] + h_1[n]s_j[n-1]\}$. The branch metrics for all branches of a path through the trellis are accumulated to result in a "path metric" $P_i$ for a path ending on state "i". The sequence of symbols $\{s[n]\}$ along the path through the trellis with the lowest path metric $P_{min}$, is the maximum likelihood sequence.

There are numerous possible paths through the trellis. It is only necessary to retain as many path metrics as there are nodes. In the present example, the number of path metrics is 4.

With the above definitions, the Viterbi method may be described as a maximum likelihood recursive technique that decodes symbols by tracing an optimal path of symbols through the trellis.

Figure 2B:
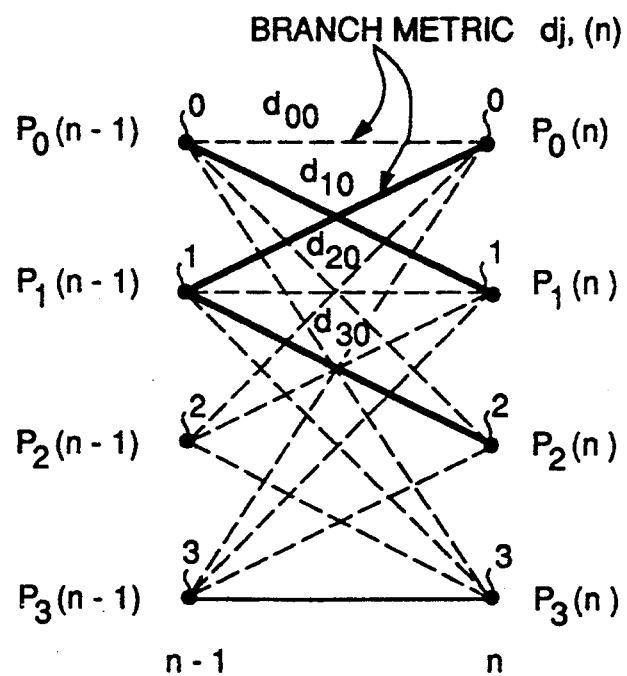
FIG. 2b is a diagram of one stage of a trellis state diagram having four states corresponding to a single transmitted symbol.

FIG. 2b illustrates one stage of the recursion. Four branches from states 0,1,2,3 at time $n-1$ to state 0 at time n. Each of these branches uniquely specifies a symbol pair $\{s[n-1], s[n]\}$ and hence represents a unique "length" or "distance" computation for each path segment from state j at time $n-1$ to state i at time n corresponding to a Euclidian distance from a received symbol and estimated a symbol constellation point from $\{Z\}$ or $\{\hat{Z}\}$. Each of the four distances are computed, namely, $\{d_{00}(n),d_{20},d_{10}(n),d_{30}(n)\}$ according to Eq. (4). Next, the accumulated path distances, namely $\{P_0(n-1)+d_{00}(n)\}$, $\{P_1(n-1)+d_{10}(n)\}$, $\{P_2(n-1)+d_{20}(n)\}$, $\{P_3(n-1)+d_{30}(n)\}$, are computed corresponding to distances up to the state 0 at time n. Then the minimum of the four accumulated distances is chosen. This becomes the new path metric $P_0(n)$.

The transition from state j at time $n-1$ to state i at time n that produced this minimum path metric (corresponding to the most probable state) is stored. The connected transitions or branches that produce the minimum path metric up to a certain point in the trellis is referred to as the "path history". A register, referred to as $PH_n(i)$, exists for each node where n is a symbol period number or trellis stage number, and i is a state number of the initial state. The value store in each register indicates a transition from the present state to the most likely state in the previous symbol period. Stated differently, the register simply points from the current state i at time n to the previous state j at time n−1 which produces the minimum Euclidian distance among the 4 possible branches from state j at time n−1 to state i at time n. Hence, the path history serves to remember or index the path branches that contribute to the best overall path.

In a similar manner the new path metrics and path histories are computed and stored for states 1,2,3 at time n. The above recursive computation for the $n^{th}$ stage of the trellis can be expressed symbolically as:

$$P_i(n) = \min_j [P_j(n-1) + d_{ji}(n)], \, i, j = 0, 1, 2, 3 \quad (5a)$$

Store state j for time n obtained in Eq. (5a) in register $PH_n(i)$. \quad (5b)

The above recursion is performed for each stage of the trellis. There will be as many stages as transmitted symbols. At the end of the trellis all the accumulated path metrics $P_i(N)$, i=0,1,2,3 are compared and the minimum is chosen.

Next, starting from the last state of the path corresponding to this minimum path metric, the path from this node is traced backward in time using the path history pointers $PH_n(i)$. The symbols corresponding to state transitions which occur during trace back are taken to be the decoded sequence. (Recall that each node corresponds to a possible symbol value). This trace-back process may be expressed through the following sequence of operations:

$$P_{min} = \min_i P_i(N) \quad (6a)$$

start with state i corresponding $P_{min}$ \quad (6b)

set symbol period n=N \quad (6c)

read $PH_n(i)$ to locate node j at symbol time n−1 \quad (6d)

store symbol corresponding transition from nodes j→i at symbol times n−1→n \quad (6e)

set symbol period n=n−1 \quad (6f)

set state i=j and repeat (6d)−(6f) recursively until starting node (n=1) \quad (6g)

The above procedure, comprising Eqs. (3−6), comprise the method similar to that employed by the Viterbi algorithm. This method may be summarized as follows:

Step 1
Initialize all path metrics $P_i(0)$, i=0,1,2,..., M−1 to zero, where M is the number of possible states.
If the starting state is known, the path metric corresponding to this state is set equal to zero and all other path metrics are set to a large positive number.
set time n=1
Step 2
compute the accumulated path metric $$P_i(n) = \min_j [P_j(n-1) + d_{ji}(n)] \text{ for } i = 0, 1, 2, \ldots, M-1$$

Step 3
For each state i at symbol time period n, store the state transition (i→j) that produces the minimization in step 2, in a path history $PH_n(i)$ memory register. If N is the number of symbol periods, there will be M×N path history memory registers, denoted by:
$PH_n(0)$, $PH_n(1)$, ..., $PH_n(M)$; where n=1,2,3,..., N
Step 4
Increment n=n+1 and repeat step 2 and step 3 until n=N
Step 5
Find $$\min_i P_N(i)$$

and store index i corresponding to minimum accumulated path metric.
Step 6
Trace back and decode symbols as follows:
a) start with state i corresponding to $$\min_i P_N(i)$$

of previous step;
b) set symbol period n=N;
c) read $PH_n(i)$ to locate node j at symbol time n=1;
d) store symbol corresponding transition from nodes j→i at symbol times n−1→n;
e) set symbol period n=n−1; and
f) set state i=j and repeat steps c) d) and e) recursively until starting node (n=1).

The concept of decision depth is used very frequently with the Viterbi algorithm. Usually, it is seen that after following the trellis for a certain length, say n stages and tracing back to a distance δ stages and it is determined that all paths at time n−δ have a common state. This implies that up to time n−δ there is a single path that maybe taken to be the best. This means that at time n−δ a firm decision may be made as to what the symbol is at that time. This circumvents the need to traverse the whole trellis before tracing back and then deciding upon the symbols. The depth or distance n−δ used for making our decision on a decoded symbol is known as "decision depth".

Figure 3:
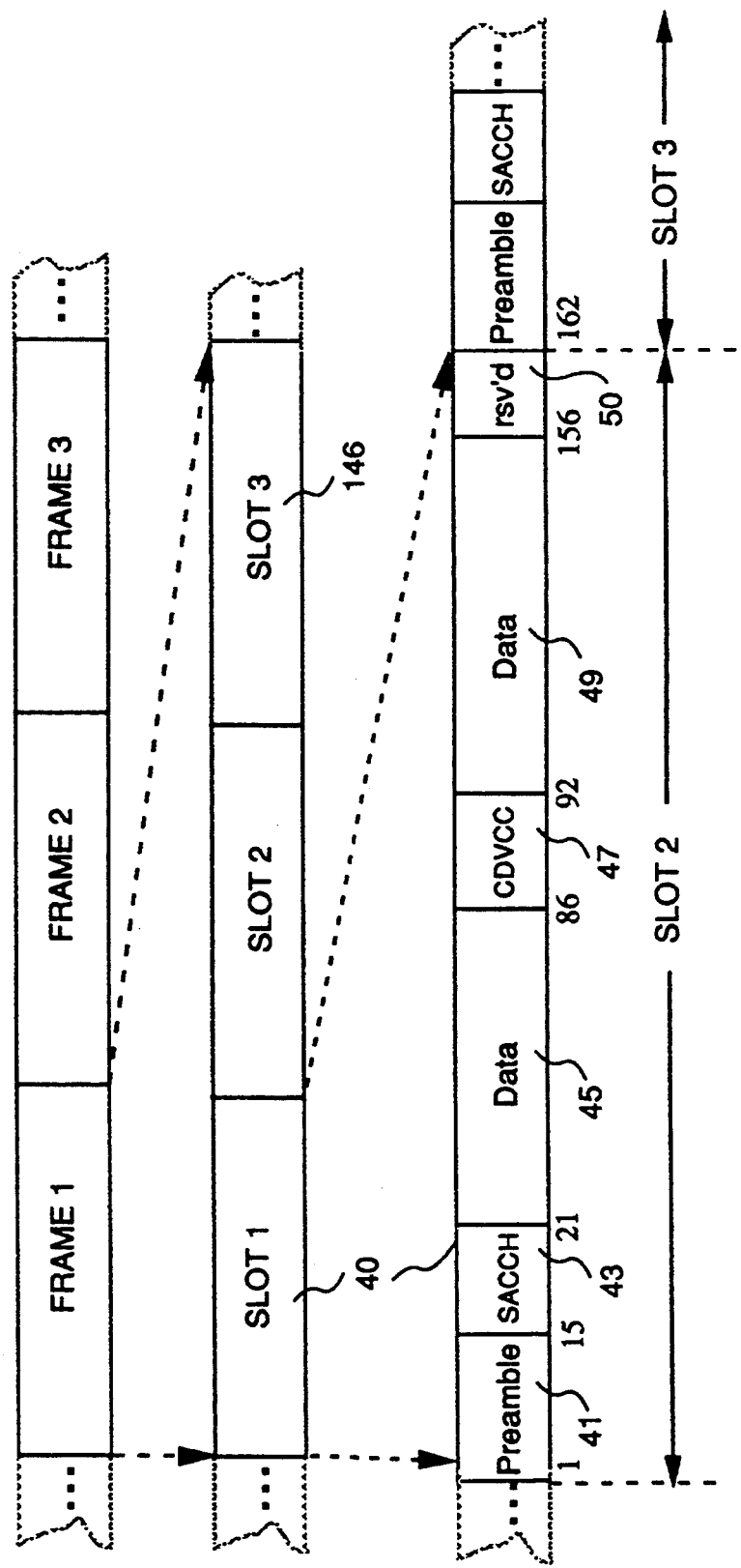
FIG. 3 is an illustration of data transmission format for time division multiplexed access (TDMA) U.S. Digital Cellular telephone IS-54 base unit to mobile unit.

The channel impulse response (CIR) coefficients $h_0[n]$, $h_1[n]$ are required to determine the estimated received symbols and minimize the branch metric equation Eq. (4) and must be estimated over known symbols, such as a set of synchronization or ("sync") symbols which are transmitted during each slot of data. FIG. 3 is a standard data format for U.S. cellular telephones for Base to Mobile communications. The sync symbols may be from preamble bit positions 1 to 14 or a coded digital verification color code (CDVCC) 47, bit positions 86 to 91 of a slot of data 40 as shown in FIG. 3. The remaining portions of slot 40 are the slow associated control channel (SACCH) information 43, bit positions 15 to 20, data sections 45, 49 bit positions 21 to 85, and 92 to 155, respectively, for the message data and reserved bits, bit positions 156 to 162. There are three slots per frame in this format.

Also, since channel coefficients $h_0[n]$, $h_1[n]$ change over time, they must be updated or interpolated periodically. This also becomes computationally burdensome, and may be too complex to implement in a hand-held transmitter/receiver.

Decoding: Present Invention

Figure 4A:
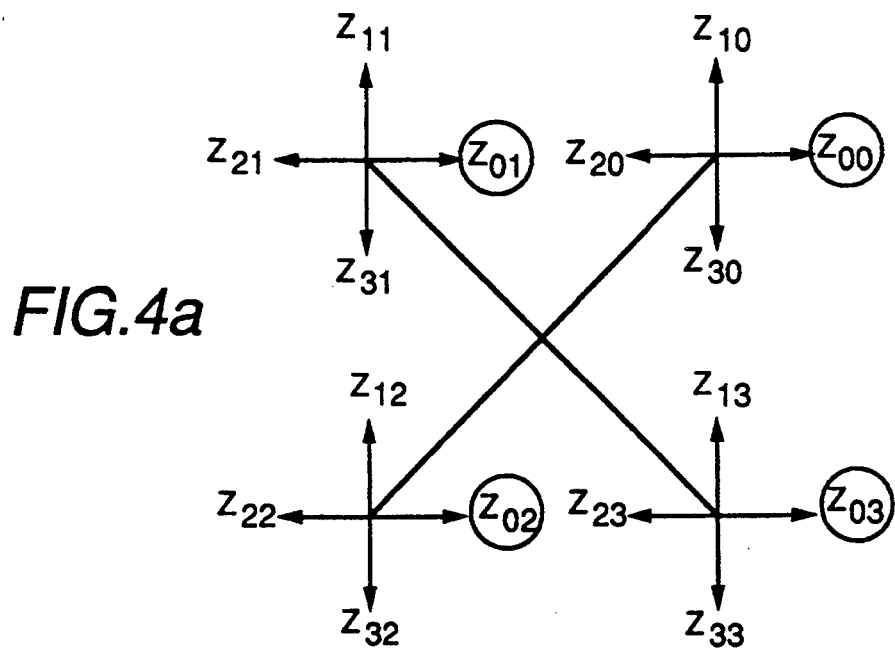
FIG. 4a is a diagram of an estimate of possible received symbols incorporating intersymbol interference from a previously transmitted symbol when an even $\pi/4$-shifted DQPSK constellation symbol is transmitted.

Since $\pi/4$-shifted DQPSK symbols are transmitted as a phase angle in an alternating fashion, as shown in FIGS. 1a, 1b, ISI will result from the previously transmitted symbol $s[n-1]$, being from the opposite symbol constellation (odd vs. even) as the presently transmitted symbol $s[n]$. FIG. 4a illustrates possible received symbols for the last received symbol being from the even constellation, and FIG. 4b for the odd constellation when the relative amplitudes are specified as shown in FIG. 4c. This is the result of vector addition of $h_0[n]\, s[n]$ and $h_1[n]\, s[n-1]$, having symbols 0, 1, 2, 3 for symbol n and symbol n−1 adjusted by channel coefficients $h_0[n]$ $h_1[n]$ to result in 16 possibilities. A new term will be defined which is the vector sum of $h_0[n]\, s[n]$ and $h_1[n]\, s[n-1]$ denoted as the estimated symbol constellation points $\{Z\}$ for the even constellation and described by:

$$Z_{ji}=h_0 s_i[n]+h_1 \hat{s}_j[n-1] \text{ for } i,j=0,1,2,3 \qquad (7a)$$

where $s[n]$ takes on one of the values of the even $\pi/4$-shifted DQPSK symbols and $\hat{s}[n-1]$ takes on one of the values of the odd $\pi/4$-shifted DQPSK symbols.

The corresponding estimated symbol constellation points are described by:

$$\hat{Z}_{ji}=h_0 \hat{s}_i[n]+h_1 s_j[n-1] \text{ for } i,j=0,1,2,3 \qquad (7b)$$

where $\hat{s}[n]$ takes on one of the values of the odd $\pi/4$-shifted DQPSK symbols and $s[n-1]$ takes on one of the values of the even $\pi/4$-shifted DQPSK symbols.

Symmetry

Figure 4B:
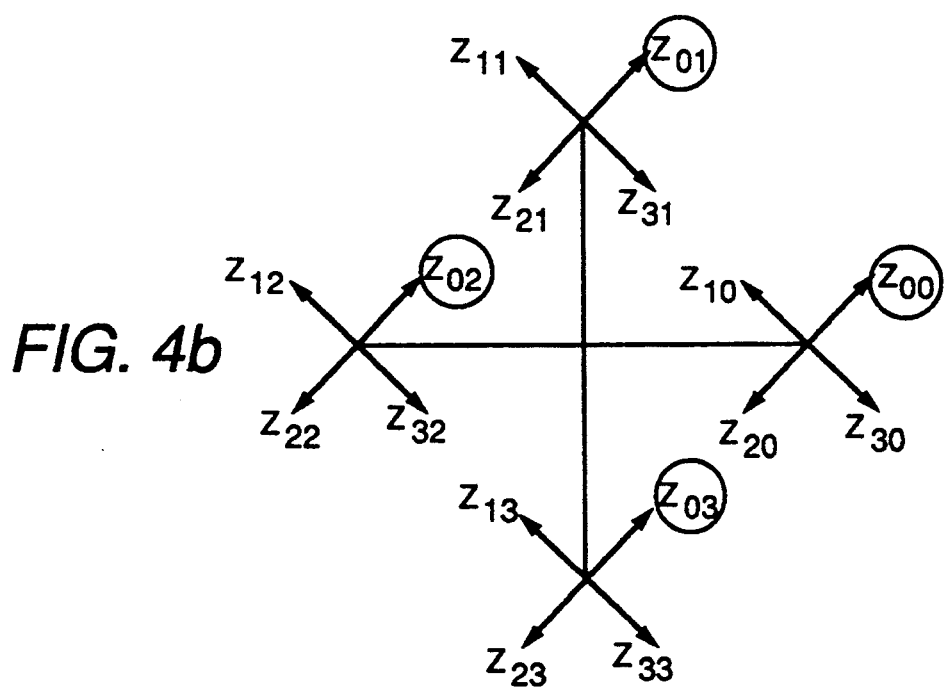
FIG. 4b is a diagram of an estimate of possible received symbols incorporating intersymbol interference from a previously transmitted symbol when an odd $\pi/4$-shifted DQPSK constellation symbol is transmitted.
Figure 4C:
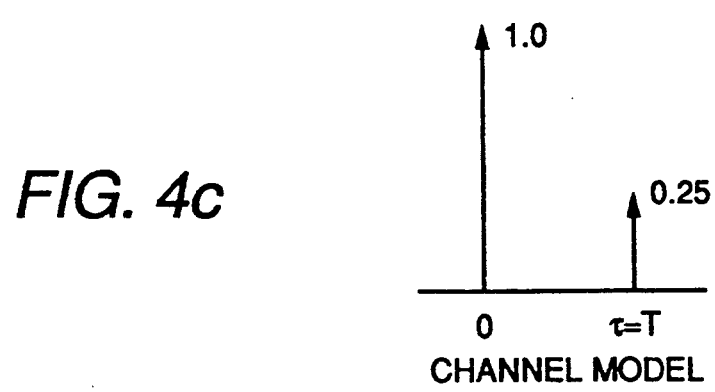
FIG. 4c is an illustration of the relative gains of a primary symbol and an interfering previously transmitted symbol.

By analyzing the symmetry of FIGS. 4a and 4b it is apparent that $Z_{11}$ is $Z_{00}$ shifted by $\pi/2$ or multiplied by $e^{j\pi/2}$, and $Z_{22}=Z_{00}$ shifted by $e^{j\pi}$ etc. The 16 possible states of FIG. 4a may be represented by four reference states and appropriate phase shifts. Similarly, the 16 possible states of FIG. 4b may be represented by four reference states with appropriate phase shifts. The relations may be grouped as follows:

Group 0
$Z_{00}(n)$
$Z_{11}(n)=Z_{00}(n)e^{j\pi/2}$
$Z_{22}(n)=Z_{00}(n)e^{j\pi}$
$Z_{33}(n)=Z_{00}(n)e^{j3\pi/2}$
Group 1
$Z_{01}(n)$
$Z_{12}(n)=Z_{00}(n)e^{j\pi/2}$
$Z_{23}(n)=Z_{00}(n)e^{j\pi}$
$Z_{30}(n)=Z_{00}(n)e^{j3\pi/2}$
Group 2
$Z_{02}(n)$
$Z_{13}(n)=Z_{02}(n)e^{j\pi/2}$
$Z_{20}(n)=Z_{02}(n)e^{j\pi}$
$Z_{31}(n)=Z_{02}(n)e^{j3\pi/2}$
Group 3
$Z_{03}(n)$
$Z_{10}(n)=Z_{03}(n)e^{j\pi/2}$
$Z_{21}(n)=Z_{03}(n)e^{j\pi}$
$Z_{32}(n)=Z_{03}(n)e^{j3\pi/2}$ There may be some confusion with regard to the use of the lower case letters "j" and "j". The letter "j" (italics) signifies the complex operator while the letter "j" (non italicized) signifies the index of a state. This point should be noted throughout the specification.

Similarly, from FIG. 4b we can form a set of relationships for the odd constellation. The relationships are identical to the above set and is obtained by replacing all $Z_{ji}(n)$ by $\hat{Z}_{ji}(n)$.

From the above relationships we notice that the entire set of 16 constellation points can be derived from the basic set of estimated reference symbol constellation points given by $\{Z_{00}(n), Z_{01}(n), Z_{02}(n) Z_{03}(n)\}$. All other estimated symbol constellation points can be obtained by rotations of these 4 basic quantities by $\pi/2$, $\pi$ and $3\pi/2$ radians as indicated above. (Note: $e^{j\pi/2}$ represents a rotation in the counter-clockwise direction by $\pi/2$ radians and $e^{-j\pi}$ represents a rotation by $\pi$ radians in the clockwise direction.)

Hence, we store only 8 basic signal constellation points, instead of 32 points, corresponding to two constellations, namely, $\{\hat{Z}_{00}(n),\hat{Z}_{01}(n),\hat{Z}_{02}(n)\hat{Z}_{03}(n)\}$ and $\{Z_{00}(n),Z_{01}(n),Z_{02}(n)Z_{03}(n)\}$. The estimated reference symbol constellation points may be labelled as follows:

(Even) Reference Symbol Constellation Points (States)
$Z_0^{ref}(n)=Z_{00}(n)$
$Z_1^{ref}(n)=Z_{01}(n)$
$Z_2^{ref}(n)=Z_{02}(n)$
$Z_3^{ref}(n)=Z_{03}(n)$ (Odd) Reference Symbol Constellation Points (States)
$\hat{Z}_0^{ref}(n)=\hat{Z}_{00}(n)$
$\hat{Z}_1^{ref}(n)=\hat{Z}_{01}(n)$
$\hat{Z}_2^{ref}(n)=\hat{Z}_{02}(n)$
$\hat{Z}_3^{ref}(n)=\hat{Z}_{03}(n)$ As mentioned earlier, there is a relationship between these two basic sets of constellation points which can be represented as:

$$Z_m^{ref}(n)=\hat{Z}_k^{ref}(n)e^{j\pi/4}$$

where $m=(k+3) \mod 4$ and $k=0,1,2,3$ \qquad (8a)

$$\hat{Z}_k^{ref}(n)=Z_m^{ref}(n)e^{-j\pi/4}$$

where $k=(m+1) \mod 4$ and $m=0,1,2,3$ \qquad (8b)

CIR estimation

The basic quantity used in the metric computations are the reference states, namely, $\{Z^{ref}\}$, $\{\hat{Z}^{ref}\}$. An initial estimate of these quantities is required to decode subsequent received signal samples. These estimates are obtained by estimating the CIR coefficients $h_0[n]$, $h_1[n]$ and convolving the estimated CIR with the corresponding hypothesized symbols.

The CIR estimate is obtained as a solution to a least squares problem. This estimation problem can be stated as follows:

find $h_0[n], h_1[n], \ldots, h_{L-1}[n]$ such that $$\sum_{n=1}^{N_p} \left| r_n - \sum_{i=0}^{L-1} h_i(n) s[n-i] \right| \qquad (9)$$

is minimized, where $N_p$ corresponds to the number of sync symbols in preamble or CDVCC.

The exact solution to Eq. (9) can be written in matrix form as follows:

$$h=[S^H S]^{-1} S^H R \qquad (10)$$

where $S^H$ is defined as $S^H=[S^T]^*$, $h=[h_0[n]\ h_1[n]\ \ldots\ h_{L-1}[n]]^T$,
$R=[r_1[n]\ r_2[n]\ \ldots\ r_{N_p}[n]]$ and the matrix S is given by:

$$S = \begin{bmatrix} s[1] & s[2] & \cdots & s[N_p - L + 1] \\ s[2] & s[3] & \cdots & s[N_p - L + 2] \\ \cdot & \cdot & & \cdots \\ \cdot & \cdot & & \cdots \\ \cdot & \cdot & & \cdots \\ s[N_p - L] & s[N_p - L + 1] & \cdots & s[N_p] \end{bmatrix} \quad (11)$$

The matrix given by Eq. (11) comprises symbols of the preamble. Hence, the matrix defined as $M = [S^H S]^{-1} S^H$ can be pre-computed. Using this definition the CIR can be estimated by a matrix multiplication as follows:

$$h = MR \quad (12a)$$

A two ray channel is assumed (as per the IS-54 standard) and hence, there are only two CIR coefficients which are labeled as $h_0[n], h_1[n]$.

The CIR coefficients $h_0[n], h_1[n]$ obtained through Eq. (12a) may be noisy and may be refined by the following a smoothing scheme, which is realized by implementing equations Eq. (12b–12e) in an iterative loop for $n = 1, 2, \ldots, N_p$.

$$e(n) = r(n) - h^T[n]S[n]$$

where $h^T = [h_0[n]\ h_1[n]]$ and $S^T[n] = [s_{pre}[n]\ s_{pre}[n-1]]$ (12b)

$$h[n+1] = h[n] + 0.5e(n)S^*[n] \quad (12c)$$

where $S^*[n]$ is the complex conjugate of $S[n]$.

$$\bar{h}[n+1] = \bar{h}[n] + \frac{1}{\sigma(n)} \{h[n+1] - \bar{h}[n]\} \text{ with } \bar{h}[1] = 0 \quad (12d)$$

where $\sigma(n) = \lambda \sigma(n) + 1$; $\sigma(0) = 0$; $\lambda = 0.6 - 1.0$ (12e)

$\sigma$ is a weighting factor.
$\bar{h} = [\bar{h}_0[n]\bar{h}_1[n]]^T$ is a smoothed version of the CIR coefficients h.

The reference signal constellation (even) points can be obtained as follows:

$$Z_i^{ref} = \bar{h}_0[n]s_i + \bar{h}_1[n]\hat{s}_0; \text{ for } i = 0, 1, 2, 3 \quad (13)$$

where $\{\bar{h}_0[n]\bar{h}_1[n]\}$ have been smoothed over the number of sync symbols $N_p$.

It is noted that for a $\pi/4$-shifted-DQPSK signal $s_i$, $i = 0, 1, 2, 3$ represents the four symbols, $$\left\{ \frac{1}{\sqrt{2}} + j\frac{1}{\sqrt{2}}, -\frac{1}{\sqrt{2}} + j\frac{1}{\sqrt{2}}, -\frac{1}{\sqrt{2}} - j\frac{1}{\sqrt{2}}, \frac{1}{\sqrt{2}} - j\frac{1}{\sqrt{2}}, \right\}$$

constellation and $\hat{s}_0$ represents the symbol $1 + j0$ which is from the odd constellation.

Similarly, the reference signal constellation points corresponding to the odd constellation resulting in:

$$\hat{Z}_i^{ref} = \bar{h}_0[n]\hat{s}_i + \bar{h}_1[n]s_0; \text{ for } i = 0, 1, 2, 3 \quad (14)$$

For a $\pi/4$-shifted-DQPSK signal $\hat{s}_i$, $i = 0, 1, 2, 3$ represents the four symbols, $\{1, j, -1, -j\}$, from the odd constellation and $s_o$ represents the symbol $$\frac{1}{\sqrt{2}} + j\frac{1}{\sqrt{2}}$$

which is from the even constellation.

Simplified Computation of Branch Metrics

Using the above definitions for signal points, the number of computations in the branch metrics of Eq. (4) may be simplified as follows:

The branch metric for a trellis stage corresponding to an even symbol transmitted, can be written as:

$$d_{ji}(n) = |r_n - Z_{ji}(n)|^2 \quad (15)$$

where $Z_{ji}$ are defined previously.

However, since only four of the sixteen values of $Z_{ji}(n)$ are stored, Eq. (9) must be expressed in terms of the four basic reference states $\{Z^{ref}\}$. Equation (15) can be rewritten as:

$$d_{ji}(n) = |r[n] - Z_k^{ref}(n)e^{j\pi/2 \cdot j}|^2 \quad (16)$$

where $k = (i + 3j) \mod 4$ and $i, j = 0, 1, 2, 3$. Eq. (16) can also be written as:

$$d_{ji}(n) = |r_n e^{-j\pi/2 \cdot j} - Z_k^{ref}(n)|^2 \quad (17a)$$

where $k = (i + 3j) \mod 4$ and $i, j = 0, 1, 2, 3$.

Similarly, the branch metric for a trellis stage corresponding to an odd symbol transmitted can be written as:

$$d_{ji}(n) = |r[n]e^{-j\pi/2 \cdot j} - \hat{Z}_m^{ref}(n)|^2 \quad (17b)$$

where $m = (i + 3j) \mod 4$ and $i, j = 0, 1, 2, 3$. From Eqs. (16), (17a) and (17b) it becomes apparent that each distance value $d_{ji}(n)$ can be computed by rotating one of the four stored reference states $\{\hat{Z}\}$ or $\{Z\}$ in a counter-clockwise direction by an integral multiple of 90 degrees (modulo 360 degrees), or by rotating the received signal in a clockwise direction by an integral multiples of 90 degrees (modulo 360 degrees). The latter is more efficient as it entails only four complex multiplies (rotations), while the former entails sixteen complex multiplies (rotations).

Further, simplifications in computation of branch metrics can be achieved by grouping distance computations and avoiding repetitions in computations. To illustrate this four groups of distances are formed as follows:

Group 0
$\{d_{00}(n), d_{11}(n)d_{22}(n)d_{33}(n)\}$
Group 1
$\{d_{01}(n), d_{12}(n)d_{23}(n)d_{30}(n)\}$
Group 2
$\{d_{02}(n), d_{13}(n)d_{20}(n)d_{31}(n)\}$
Group 3
$\{d_{03}(n), d_{10}(n)d_{21}(n)d_{32}(n)\}$ $Z_k^{ref}(n)$ and $\hat{Z}_m^{ref}(n)$ may be expressed in Cartesian form as:

$$Z_k^{ref}(n) = a_k(n) + jb_k(n)$$

$$\hat{Z}_m^{ref}(n) = \hat{a}_m(n) + j\hat{b}_m(n)$$

Further, let message symbols $r_{sp}[n] = I[n] + j Q[n]$. Hence, from Eq. (4) distances can be computed within a group as:

Distance Calculation for Group 0

$$d_{00}(n) = I^2[n] + Q^2[n] + a_0^2(n) + b_0^2(n) - 2(a_0(n)I[n] + b_0(n)Q[n])$$

$$d_{11}(n) = I^2[n] + Q^2[n] + a_0^2(n) + b_0^2(n) - 2(a_0(n)Q[n] - b_0(n)I[n])$$

$$d_{22}(n) = I^2[n] + Q^2[n] + a_0^2(n) + b_0^2(n) + 2(a_0(n)I[n] + b_0(n)Q[n])$$

$$d_{33}(n) = I^2[n] + Q^2[n] + a_0^2(n) + b_0^2(n) - 2(a_0(n)Q[n] + b_0(n)I[n])$$

The corresponding distances for all other groups can be calculated as shown above. Scaling the above distances by a constant does not alter the optimization criterion of Eq. (5a). Hence, the above distances may be scaled by a factor of ½. Further, the term $I^2[n] + Q^2[n]$ is a constant for all 16 distance computations and can be eliminated from the computations. This term represents the instantaneous power in the received signal.

Scaling the distances by a factor of ½ and eliminating the received power term $I^2[n] + Q^2[n]$ the 16 distances (branch metrics) can be written as:

Branch Metric Calculation for Group 0

$$d_{00}(n) = \frac{a_0^2(n) + b_0^2(n)}{2} - (a_0(n)I[n] + b_0(n)Q[n])$$

$$d_{11}(n) = \frac{a_0^2(n) + b_0^2(n)}{2} - (a_0(n)Q[n] - b_0(n)I[n])$$

$$d_{22}(n) = \frac{a_0^2(n) + b_0^2(n)}{2} + (a_0(n)I[n] + b_0(n)Q[n])$$

$$d_{33}(n) = \frac{a_0^2(n) + b_0^2(n)}{2} + (a_0(n)Q[n] - b_0(n)I[n])$$

Branch Metric Calculation for Group 1

$$d_{01}(n) = \frac{a_1^2(n) + b_1^2(n)}{2} - (a_1(n)I[n] + b_1(n)Q[n])$$

$$d_{12}(n) = \frac{a_1^2(n) + b_1^2(n)}{2} - (a_1(n)Q[n] - b_1(n)I[n])$$

$$d_{23}(n) = \frac{a_1^2(n) + b_1^2(n)}{2} + (a_1(n)I[n] + b_1(n)Q[n])$$

$$d_{30}(n) = \frac{a_1^2(n) + b_1^2(n)}{2} + (a_1(n)Q[n] - b_1(n)I[n])$$

Branch Metric Calculation for Group 2

$$d_{02}(n) = \frac{a_2^2(n) + b_2^2(n)}{2} - (a_2(n)I[n] + b_2(n)Q[n])$$

$$d_{13}(n) = \frac{a_2^2(n) + b_2^2(n)}{2} - (a_2(n)Q[n] - b_2(n)I[n])$$

$$d_{20}(n) = \frac{a_2^2(n) + b_2^2(n)}{2} + (a_2(n)I[n] + b_2(n)Q[n])$$

$$d_{31}(n) = \frac{a_2^2(n) + b_2^2(n)}{2} + (a_2(n)Qn - b_2(n)I[n])$$

Branch Metric Calculation for Group 3

$$d_{03}(n) = \frac{a_3^2(n) + b_3^2(n)}{2} - (a_3(n)I[n] + b_3(n)Q[n])$$

-continued $$d_{10}(n) = \frac{a_3^2(n) + b_3^2(n)}{2} - (a_3(n)Q[n] - b_3(n)I[n])$$

$$d_{21}(n) = \frac{a_3^2(n) + b_3^2(n)}{2} + (a_3(n)I[n] + b_3(n)Q[n])$$

$$d_{32}(n) = \frac{a_3^2(n) + b_3^2(n)}{2} + (a_3(n)Q[n] - b_3(n)I[n])$$

The corresponding branch metrics for the odd symbol constellation are given by replacing "a" with "â" and "b" with "b̂", and "d" with "d̂", where "â,b̂" are the complex components of odd symbol constellation points $\{\hat{Z}\}$ "d̂" is the Euclidian distances between the received message symbol $r_{sp}[n]$ and each odd symbol constellation point.

The above branch metric expressions can be computed using a total of 56 operations (28 multiplies and 28 adds). The "brute-force" method of computation represented by Eq. (16) requires 80 operations (32 multiplies and 48 adds) to compute all 16 branch metrics. Hence, the above method provides a saving of 24 operations per trellis stage. This translates to a saving of 3408 operations per data slot (142 symbols).

Additional Savings in Computations

An additional savings of 12 operations per stage can be achieved by storing the values of coefficients $X_i$, $$\frac{a_i^2(n) + b_i^2(n)}{2},$$

for those "i" states that are not updated. In a preferred embodiment, only one state is updated per trellis stage. This provides a reduction in the number of operations per stage from 56 to 44. The total savings is 4684 operations per data slot.

It is to be noted that the above branch metrics can be computed in Polar co-ordinates to provide an additional saving of 4 operations, per trellis stage, over the Cartesian method. However, the Polar method entails a higher complexity in the overall algorithm, mainly due to Cartesian to Polar conversions, and is considered only as an alternative.

Update Method 1 (No Decision Depth)

The reference signal updating mechanism can now be explained as follows. Let us consider that the trellis search has progressed up to an even stage, for example stage n. At stage n the path metrics $P_0(n)$, $P_1(n)$, $P_2(n)$ are compared and the minimum is chosen. Taking, for example, the minimum being $P_1(n)$. Next, record the branch or transition from state j at stage n−1 to state 1 at stage n. Assume that this transition j→1 corresponds to the transition from state 2 (i.e. j=2) at stage n−1 to state 1 at stage n. Recall that each transition in a trellis stage defines one of the reference signal constellation points. In this example the 2→1 transition defines the reference signal $Z_{(i+3j) \bmod 4}^{ref}(n) = Z_{(1+3*1) \bmod 4}^{ref}(n) = Z_0^{ref}(n)$. This reference state is then updated according to the following rule:

$$\hat{Z}_k^{ref}(n) = \quad (18a)$$

$$\hat{Z}_k^{ref}(n-D) + \frac{(1-\gamma)}{\gamma^D - \gamma^n - \gamma + 1}[r_n[n]e^{-j\pi/2 \cdot j} - \hat{Z}_k^{ref}(n-D)]$$

where k=(1+3j) mod 4, D represents the delay corresponding to the last time this reference signal constellation point was updated, $\gamma$ is a time constant that determines the rate of adaptation and noise variance, $\gamma$ is chosen to be a value between 0 and 1. The value $\gamma=0.7$ was found to be optimal for our specific application. The received message sample $r_{sp}[n]$ must be rotated in a clockwise direction by $\pi/2*j$ degrees, where j is then obtained from the j→i transition recorded. Note, that this rotation is done during the computation of branch metrics and need not be repeated in Eq. (18a).

In the above scheme, a reference state is updated every alternate stage. Since there are 4 odd and 4 even reference signal points, this implies that each reference signal point will be updated on an average every 8th symbol time. The period between symbol updates may be reduced to once every 4th symbol time period by using the relationships specified in Eqs. (8a) and (8b). That is, if an even reference state is updated via Eq. (18a), a corresponding odd reference signal may be updated using Eq. (8a). Similarly, if an odd reference state is updated, an even reference state may be updated using Eq. (8b). The rotations implied by Eqs. (8a) and (8b) may be performed in Polar form or Cartesian form as follows:

$$\hat{Z}_m^{ref}(n) = Z_k^{ref}(n)e^{-j\pi 5}; \text{ where } m = (k + 3)\text{mod}4 \text{ (Polar)} \quad (18b)$$

$$= \frac{1}{\sqrt{2}} [(I_k + Q_k) + j(Q_k - I_k)] \text{ (Cartesian)}$$

where $\{I_k, Q_k\}$ are the complex components of $Z_k^{ref}(n)$.

The updating procedure at odd stages in the trellis is identical to the above procedure outlined for even stages. Only now, the odd reference signal states are updated according to Eq. (18a) and the corresponding even reference state is updated by a 45 degree rotation as specified in Eq. (8b). The corresponding update equations for odd stage of the trellis is:

$$\hat{Z}_m^{ref}(n) = \quad (19a)$$

$$\hat{Z}_m^{ref}(n - D) + \frac{(1 - \gamma)}{\gamma^D - \gamma^n - \gamma + 1} [r_n e^{-j\pi/2*j} - \hat{Z}_m^{ref}(n - D)]$$

where m=(i+3j) mode 4; with the corresponding secondary even reference symbol being updated from the odd symbol according to:

$$Z_k^{ref}(n) = \hat{Z}_m^{ref}(n)e^{-j\pi/4}; \text{ where } k = (m + 1)\text{mod}4 \text{ (Polar)} \quad (19b)$$

$$= \frac{1}{\sqrt{2}} [(\hat{I}_m - \hat{Q}_m) + j(\hat{I}_m + \hat{Q}_m)] \text{ (Cartesian)}$$

where $\{\hat{I}_m, \hat{Q}_m\}$ are the complex components of $\hat{Z}_m(n)$.

Updating Method 2 (Decision Depth)

In the above updating method a decision to update a state is made based on the accumulated path metric at the stage in the trellis. This decision tends to be unreliable during poor SNR conditions. The concept of decision depth could be used to improve reliability of decoding symbols. The same concept can be used to update the reference states. In this method the state corresponding to the minimum path metric is chosen and starting from this state the trellis is traced backwards by a number of symbols corresponding to the decision depth ($\delta$). The resulting state is more reliable than the state which would have resulted without decision depth. This state is used as reference state (i) for the previously described Update Method 1. Note that Update Method 1 is essentially the same as Update Method 2 with a decision depth of 0.

Some subtleties in implementing the above technique must be observed. First, a time delay of $\delta$ must be included in Eqs. (18a) and (19a) which implies subtracting $\delta$ from n and D. Now, the estimate of the reference signal state lags the true value by a delay $\delta$. Secondly, when the trellis is traced back an odd number of stages, by $\delta=1,3,5 \ldots$, the result is an odd stage if we start from an even stage. Hence, an odd reference symbol is updated first using Eq. (19a), and then Eq. (19b) is used to update the corresponding even reference signal point. For $\delta=0,2,4, \ldots$, an even number of stages are traced back and the update equations given Eqs. (18a) and (18b) are used.

One of the most important considerations in the implementation of this scheme is the choice of $\delta$ is a tradeoff. Larger $\delta$ implies more reliable state decisions but larger time lag. The larger time lag implies a smaller correlation between the true reference signal value and the estimated value if the channel is fading very rapidly. The $\delta$ value of $\delta=1$ was found to be optimal for the best embodiment when using the update equations Eqs. (18a, 18b, 19a, 19b).

Figure 5:
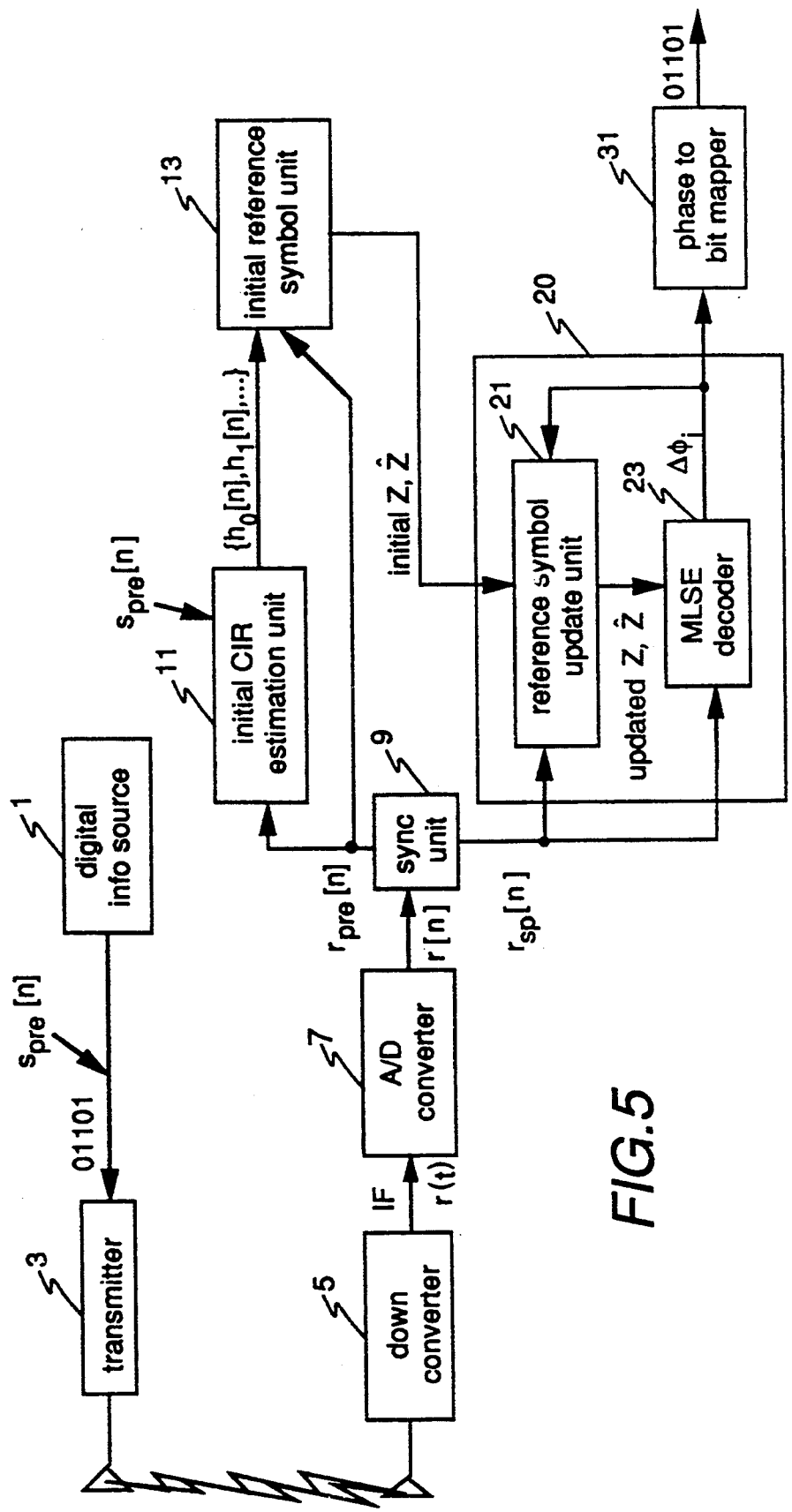
FIG. 5 is simplified block diagram of a digital radio communication system according to the present invention.

FIG. 5 is a simplified block diagram of an apparatus capable of performing the method the present invention. A digital information source 1 provides information desired to be transmitted through a channel, known as message information. This is combined with required synchronization information such as a preamble 41 or CDVCC 47 of FIG. 3.

Transmitter 3 then transmits the digital information, such as symbols from $\pi/4$-shifted differential quadrature phase shift keying (DQPSK) from alternating even, odd symbol constellations on a radiofrequency carrier signal. This signal is received and heterodyned to an intermediate frequency (IF) signal by a down converter 5.

The IF signal is sampled by an analog-to-digital (A/D) converter 7 to provide received samples r[n], where n relates to the time the sample was acquired.

A synchronization unit ("sync unit") 9 synchronizes the signal and separates the received samples into samples relating to sync samples $r_{pre}[n]$, and message samples $r_{sp}[n]$ and retains both for further processing.

An initial channel impulse response (CIR) estimation unit 11 receives the sync samples $r_{pre}[n]$, and is provided with the same predetermined sync symbols $s_{pre}[n]$ which were combined with the message data before transmission at the transmitter. The CIR estimation unit provides initial values of the CIR coefficients $\{h_0, h_1, \ldots, \}$. An initial reference symbol unit receives the initial CIR coefficients $\{h_0, h_1, \ldots, \}$, and the known sync symbols s[n], the received sync samples $r_{pre}[n]$ and constructs initial values of estimated symbol constellation points Z, $\hat{Z}$. Each estimated symbol constellation point is an approximation of the possible resulting points which would occur from differing combinations of transmitted symbols taking into account intersymbol interference from a previously transmitted symbol, and the current CIR. This may be computed by determining the CIR by a conventional method, then employing Eq. 13. In a preferred embodiment, the CIR coefficients are calculated through Eqs. 12b through 12d, and then employed in Eq, 13 to determine the initial symbol constellation points $\{Z\}$, $\{\hat{Z}\}$.

An equalizer 20, comprised of a reference symbol update unit 21, and a maximum likelihood sequence estimator (MLSE) decoder 23 equalizes the signal and decodes the symbols. MLSE decoder receives the message samples $r_{sp}[n]$ and the symbol constellation points $\{Z\}$, $\{\hat{Z}\}$ (initial values for the first stage and updated values for subsequent stages). The MLSE decoder decodes a phase angle $\Delta\phi$ corresponding to the message sample $r_{sp}[n]$ and passes this phase to reference symbol update unit 21 which updates a portion of the estimated symbol constellation points $\{Z\}$, $\{\hat{Z}\}$ according to Eqs. (18a, 18b, 19a, 19b). The estimated symbol constellation points $\{Z\}$, $\{\hat{Z}\}$ are fed back to MLSE decoder 23 to result in further message symbols being decoded. The decoded phase angles $\Delta\phi$ are sent to a phase to bit mapper which converts each decoded phase angle to a bit sequence in the same fashion as when the information was first transmitted. This process is repeated for all symbols in a slot and the entire process is repeated starting from the calculation of new initial values for CIR coefficients and estimated symbol constellation points $\{Z\}$, $\{\hat{Z}\}$ for each new set of sync symbols.

The equalizer of the present invention is specially matched to the method of decoding disclosed in U.S. patent application "Double Sided Slot Traversing (DSST) Decoding for TDMA Systems" Ser. No. 08/039,599 filed Mar. 29, 1993 by S. Chennakeshu, R. Koilpillai and R. Toy which describes dividing the sampled signal into halfslots of samples. The halfslots are subdivided into subslots numbered from 1 to $N_{SL}$, where $N_{SL}$ represents the last received subslot. Subslots 1 and $N_{SL}$ are demodulated into digital information in a forward and reverse direction, respectively with metrics calculated. If the metrics indicate a signal with a larger signal-to-noise ratio from subslot $N_{SL}$, subslot $N_{SL}-1$ is demodulated in a reverse sense with another reverse metric calculated, and vice versa. This process of extending demodulation in the direction of greater signal strength is repeated until all subslots in the slot have been demodulated. This method of decoding is specifically resistant to fades and is the preferred sequence of decoding for the present invention.

Specifically, the present invention is applicable to $\pi/4$-shifted DQPSK, and $\pi/4$-shifted QPSK and may be applied to digital cellular radiotelephone and land mobile radio equipment. There is also a potential application to personal communications systems (indoor and microcellular). The present invention is also applicable to wireless or cellular secure telephone units (STU's) and military radios. In all of the stated applications, this invention can be applied also to base stations.

Figure 6:
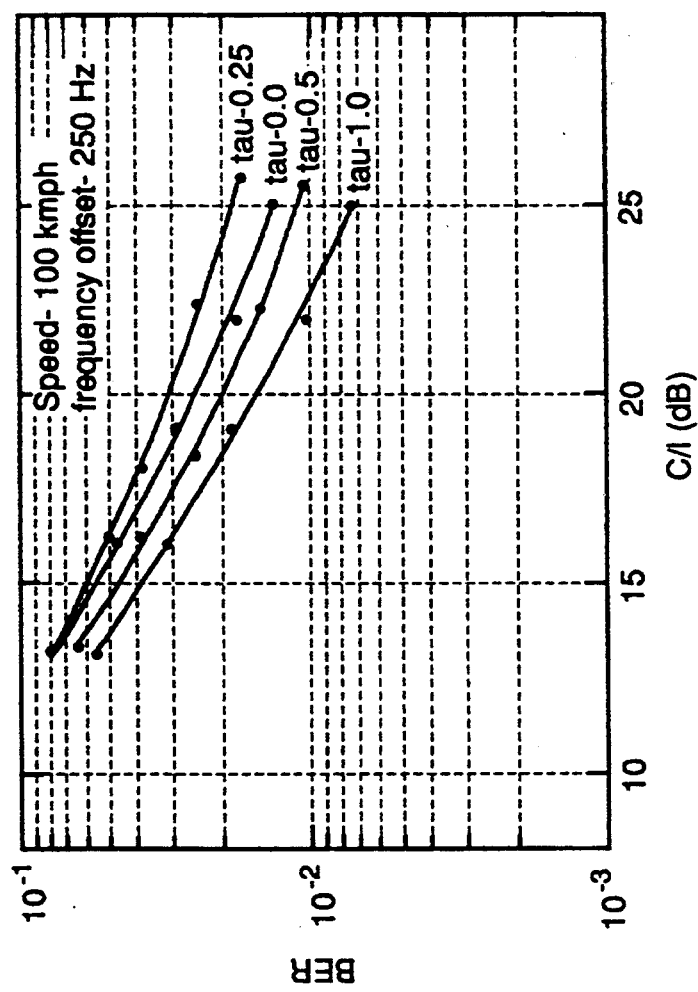
FIG. 6 is a graph of bit error rate (BER) vs. a ratio of carrier to interference (C/I) power in decibels (dB).

FIG. 6 is a graph of a simulation illustrating the performance of the present invention. For a mobile unit speed of 100 kilometers/hour, the bit error rate (BER) is graphed against the ratio of carrier to interference (C/I) power in decibels (dB). Tau ($\tau$) is the relative gain of an interfering ray.

While several presently preferred embodiments of the invention have been described in detail herein, many modifications and variations will now become apparent to those skilled in the art. It is, therefore, to be understood that the appended claims are intended to cover all such modifications and variations as fall within the true spirit of the invention.

What we claim is:

1. A method of demodulating message symbols transmitted with synchronization ("sync") symbols, known to the receiver, differentially encoded over a channel transmitted as symbols s from an even symbol constellation during even symbol periods, and as $\hat{s}$ from an odd symbol constellation during odd symbol periods, comprising the steps of:

a) receiving the message and sync symbols;
   b) calculating initial channel coefficients $\{h\}$ from the received sync symbols and the known sync symbols;
   c) calculating estimated received symbol constellation $\{Z\}$ comprised of estimated received symbols $Z_{ji}$ which is an estimate of a symbol $s_i$ being transmitted during even time periods through a channel with intersymbol interference from a previously transmitted symbol $\hat{s}_j$;
   d) calculating estimated received symbol constellation $\{\hat{Z}\}$ comprised of estimated received symbols $\hat{Z}_{ji}$ which is an estimate of a symbol $\hat{s}_i$ being transmitted during odd time periods through a channel with intersymbol interference from a previously transmitted symbol $s_j$;
   e) determining a set of reference constellation points $\{Z^{ref}\}$ and $\{\hat{Z}^{ref}\}$ being a subset of estimated received symbol constellations $\{Z\}$, $\{\hat{Z}\}$ that when rotated, provide received symbol constellations $\{Z\}$, $\{\hat{Z}\}$;
   f) determining a postulated transmitted symbol sequence which would minimize a sum of branch metrics, $d_{ji}$, each being a Euclidean distance between received message symbols and estimated symbol constellation points $Z_{ji}$, $\hat{Z}_{ji}$ for even and odd symbol periods, respectively; and
   g) directly updating reference constellation points $\{Z^{ref}\}$ and $\{\hat{Z}^{ref}\}$ to correct for changes in the channel over time.

2. The method of demodulating message symbols of claim 1 wherein the reference constellation points $\{Z^{ref}\}$ and $\{\hat{Z}^{ref}\}$ are updated during an even symbol period according to:

$$\hat{Z}_k^{ref}(n) = \hat{Z}_k^{ref}(n-D) + \frac{(1-\gamma)}{\gamma^D - \gamma^n - \gamma + 1}[r_n[n]e^{-j\pi/2 \cdot j} - \hat{Z}_k^{ref}(n-D)]$$

where $Z_k^{ref}(n)$ is a kth symbol entry of $\{Z^{ref}\}$, n is an even integer indicating an even symbol period, $k = (i+3j) \bmod 4$, D is a number of symbol periods since this estimated reference signal constellation point was last updated, $\gamma$ is a time constant having a value between 0 and 1, and the corresponding odd reference constellation point is updated from $Z_k^{ref}(n)$ according to:

$$\hat{Z}_m^{ref}(n) = Z_k^{ref}(n)e^{-j\pi/4}; \text{ where } m = (k+3)\bmod 4 \text{ (Polar)}$$

$$= \frac{1}{\sqrt{2}}[(I_k + Q_k) + j(Q_k - I_k)] \text{ (Cartesian)}$$

where $\hat{Z}_m^{ref}(n)$ is an mth symbol entry of $\{\hat{Z}^{ref}\}$, $\{I_k, Q_k\}$ are the real and imaginary components of the estimated reference symbol constellation points $Z_k^{ref}(n)$.

3. The method of demodulating message symbols of claim 1 wherein the reference constellation points $\{\hat{Z}^{ref}\}$ and $\{Z^{ref}\}$ are updated during an odd symbol period according to:

$$\hat{Z}_m^{ref}(n) = \hat{Z}_m^{ref}(n-D) + \frac{(1-\gamma)}{\gamma^D - \gamma^n - \gamma + 1}[r_n e^{-j\pi/2 \cdot j} - \hat{Z}_m^{ref}(n-D)]$$

where $\hat{Z}_m^{ref}(n)$ is an mth symbol entry of $\{\hat{Z}^{ref}\}$ for n being an odd integer, where $m = (i+3j) \bmod 4$; D is the number of symbol periods since this estimated reference signal constellation point was last updated, $\gamma$ is a time constant having a value between 0 and 1, and the corresponding reference symbol constellation point is updated from $\hat{Z}_m^{ref}(n)$ according to:

$$Z_k^{ref}(n) = \hat{Z}_m^{ref}(n)e^{j\pi/4}; \text{ where } k = (m+1)\bmod 4 \text{ (Polar)}$$

$$= \frac{1}{\sqrt{2}}[(\hat{I}_m - \hat{Q}_m) + j(\hat{I}_m + \hat{Q}_m)] \text{ (Cartesian)}$$

where $Z_k^{ref}(n)$ is a kth symbol entry of $\{Z^{ref}\}$, $\{\hat{I}_m, \hat{Q}_m\}$ are the real and imaginary components of the reference constellation points $\hat{Z}_m^{ref}(n)$.

* * * * *